US009777934B2

(12) United States Patent
Dobbins et al.

(10) Patent No.: US 9,777,934 B2
(45) Date of Patent: Oct. 3, 2017

(54) PANEL FILTER AND METHOD FOR MANUFACTURING THE SAME

(71) Applicant: Fiber Bond Corporation, Michigan City, IN (US)

(72) Inventors: Dan Dobbins, O'Fallon, IL (US); Frank Gasaway, Michigan City, IN (US); Terry Garris, LaPorte, IN (US)

(73) Assignee: FIBER BOND CORPORATION, Michigan City, IN (US)

( * ) Notice: Subject to any disclaimer, the term of this patent is extended or adjusted under 35 U.S.C. 154(b) by 159 days.

(21) Appl. No.: 14/184,235

(22) Filed: Feb. 19, 2014

(65) Prior Publication Data
US 2015/0233591 A1    Aug. 20, 2015

(51) Int. Cl.
*B32B 37/12*    (2006.01)
*F24F 3/16*    (2006.01)
*B32B 37/22*    (2006.01)
*B01D 46/00*    (2006.01)
*B32B 38/00*    (2006.01)

(52) U.S. Cl.
CPC ........ *F24F 3/1603* (2013.01); *B01D 46/0001* (2013.01); *B01D 46/0023* (2013.01); *B32B 37/1284* (2013.01); *B32B 37/223* (2013.01); *B01D 2265/06* (2013.01); *B01D 2275/10* (2013.01); *B32B 38/0004* (2013.01); *B32B 2037/1215* (2013.01); *B32B 2262/0276* (2013.01); *B32B 2305/182* (2013.01); *B32B 2305/188* (2013.01); *B32B 2307/724* (2013.01); *F24F 2003/1642* (2013.01); *Y10T 156/10* (2015.01); *Y10T 156/1052* (2015.01)

(58) Field of Classification Search
CPC ............ F24F 3/1603; F24F 2003/1642; Y10T 156/1052; Y10T 156/10; B32B 37/223; B32B 37/1284; B32B 2305/182; B32B 2262/0276; B32B 2307/724; B32B 2037/1215; B32B 2305/188; B01D 46/0023; B01D 46/0001
See application file for complete search history.

(56) References Cited

U.S. PATENT DOCUMENTS

| 3,563,828 A * | 2/1971 | Marshall ................ B01D 46/10 156/228 |
| 3,877,909 A * | 4/1975 | Hansen .................. B01D 46/10 55/487 |
| 3,938,973 A | 2/1976 | Kershaw |
| 4,047,914 A * | 9/1977 | Hansen .................. B01D 46/10 210/508 |
| 4,086,071 A | 4/1978 | Champlin |
| 4,102,785 A * | 7/1978 | Head .................... B01D 17/045 210/484 |

(Continued)

*Primary Examiner* — Amber R Orlando
*Assistant Examiner* — Britanny Precht
(74) *Attorney, Agent, or Firm* — Michael Best & Friedrich LLP

(57) ABSTRACT

A panel filter includes a first media layer constructed from a first material that is permeable to air and impermeable to particulates of a targeted size or type, a support grid, and a second media layer constructed from a second material that is permeable to air. The second media layer is adhesively coupled to the first media layer without a mechanical seal. When the first media layer and second media layer are coupled, the support grid is retained between the first media layer and the second media layer.

10 Claims, 4 Drawing Sheets

(56) References Cited

U.S. PATENT DOCUMENTS

| | | | |
|---|---|---|---|
| 4,247,316 A * | 1/1981 | Putman | B01D 46/10 55/357 |
| 4,255,175 A * | 3/1981 | Wilkins | B01D 45/10 210/470 |
| 4,737,173 A * | 4/1988 | Kudirka | B01D 46/0023 55/470 |
| 4,767,426 A * | 8/1988 | Daly | B01D 39/2024 156/86 |
| 5,082,476 A * | 1/1992 | Kahlbaugh | B01D 39/14 55/320 |
| 5,150,707 A * | 9/1992 | Anderson | A61F 7/02 604/368 |
| 5,238,474 A * | 8/1993 | Kahlbaugh | B01D 39/14 55/320 |
| 5,395,411 A * | 3/1995 | Kobayashi | B01D 39/083 55/486 |
| 5,397,632 A | 3/1995 | Murphy, Jr. et al. | |
| 5,989,320 A * | 11/1999 | Rutkowski | B01D 46/0032 55/486 |
| 5,993,501 A * | 11/1999 | Cusick | B01D 39/202 210/506 |
| 6,156,089 A * | 12/2000 | Stemmer | B01D 46/0036 55/467 |
| 6,171,369 B1 * | 1/2001 | Schultink | A47L 9/14 15/347 |
| 6,261,979 B1 | 7/2001 | Tanaka et al. | |
| 6,372,004 B1 * | 4/2002 | Schultink | A47L 9/14 15/347 |
| 7,621,989 B2 | 11/2009 | Forslund | |
| 8,021,455 B2 * | 9/2011 | Adamek | B01D 39/163 55/486 |
| 8,062,403 B2 * | 11/2011 | Goode | B01D 46/0005 55/482 |
| 8,163,054 B1 | 4/2012 | McGrath et al. | |
| 8,343,248 B2 | 1/2013 | Suzuki et al. | |
| 8,679,218 B2 * | 3/2014 | Wertz | B01D 39/163 442/381 |
| 8,986,432 B2 * | 3/2015 | Wertz | B01D 39/1623 442/1 |
| 9,149,748 B2 | 10/2015 | Nagy et al. | |
| 9,474,994 B2 * | 10/2016 | Gao | B01D 39/163 |
| 2001/0042361 A1 * | 11/2001 | Cox | B01D 39/1623 55/382 |
| 2001/0045086 A1 * | 11/2001 | Cox | B01D 39/1623 55/382 |
| 2006/0271098 A1 * | 11/2006 | Peacock | A61F 2/013 606/200 |
| 2009/0120048 A1 * | 5/2009 | Wertz | B01D 39/1623 55/521 |
| 2011/0042295 A1 * | 2/2011 | Merritt | B01D 46/0001 210/236 |
| 2013/0140228 A1 * | 6/2013 | Schwender | B01D 39/083 210/496 |
| 2014/0291222 A1 * | 10/2014 | Behrendt | B01D 35/06 210/222 |
| 2015/0013285 A1 * | 1/2015 | Disson | B01D 39/163 55/486 |

* cited by examiner

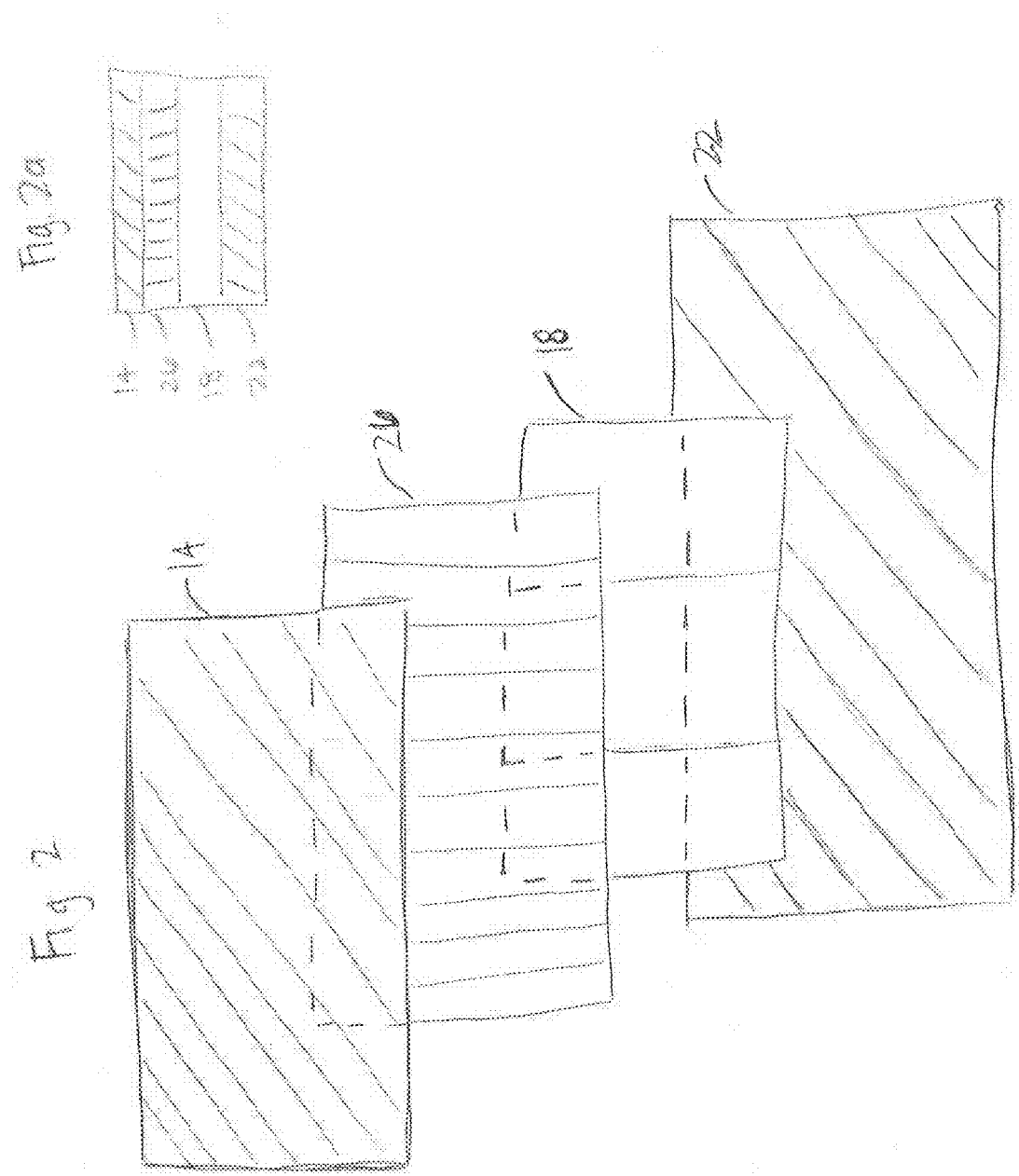

PANEL FILTER AND METHOD FOR MANUFACTURING THE SAME

BACKGROUND

The present invention relates to panel filters or panel link filters and methods for manufacturing the same.

Heating, ventilation, and air conditioning (HVAC) systems are typically used in conjunction with indoor, commercial, industrial and vehicular systems to regulate temperature and humidity using fresh air from outdoors or system return air. Modern HVAC systems include one or more internal air filters for capturing dust, pollution, and other particulates. The filters remove particulates from the air that could otherwise affect the people indoors or the equipment, products, or processes in the HVAC environment. Filters often determine, at least in part, the heat exchange rate of the HVAC system. The heat exchange rate determines the efficiency of the system and affects the lifetime of equipment. Further, dirty or oversaturated filters can cause overheating during a heating cycle, which could potentially damage the system, or at a minimum, decrease the energy efficiency of the system. Therefore, construction of the filters is pivotal to ensuring that the filter and, in turn, the systems are effective and efficient.

Panel filters or panel link filters are a type of filter that may be used in conventional HVAC systems. Conventional panel filters are constructed by mechanically sealing both the edges of two sheets of media and sealing the sheets at multiple interior locations. The edges of the two sheets of media may be mechanically sealed by RF, ultrasonic, thermal welding or, alternatively, a sewing process, for example. Similarly, the internal seals may be mechanically sealed by RF, ultrasonic, or thermal welding processes. Internal seals exist to reduce "bowing" of the panel filter. If air "bows" the panel filter, the panel filter will distort from its generally planar shape and the filter may release trapped particulates back into the HVAC system. The bowed filter may also rub against the internal HVAC components, leading to panel filter damage. However, the internal sealed regions create substantially air impervious regions in the panel filter, which decrease the area of the panel filter that is capable of capturing air particulates as the sealed area is no longer air permeable. As a result, the effectiveness and efficiency of the HVAC system is reduced.

SUMMARY

In one embodiment, the invention provides a panel filter including a first media layer constructed from a first material that is permeable to air and impermeable to particulates of a targeted size or type, a support grid, and a second media layer constructed from a second material that is permeable to air. An adhesive layer is between the first media layer and the second media layer. The adhesive layer is configured to adhesively couple the first media layer to the second media layer. When the first media layer and second media layer are coupled, the support grid is retained between the first media layer and second media layer.

In another embodiment the invention provides a panel filter including a first media layer constructed from a first material that is permeable to air and impermeable to particulates of a targeted size or type, a support grid, and a second media layer constructed from a second material that is permeable to air. The second media layer is coupled to the first media layer without a mechanical seal. When the first media layer and second media layer are coupled, the support grid is retained between the first media layer and the second media layer.

In another embodiment the invention provides a method for manufacturing a panel filter. The method includes providing a first media layer constructed from a first material that is permeable to air and impermeable to particulates of a targeted size or type. The method further includes providing a second media layer constructed from a second media layer constructed from a second material that is permeable to air. Additionally, the method includes positioning a support grid between a first media layer and a second media layer. Applying an adhesive layer between the first media layer and the second media layer, and adhesively coupling, by the adhesive layer, the first media layer to the second media layer thereby retaining the support grid between the first media layer and the second media layer are also included in the method.

Other aspects of the invention will become apparent by consideration of the detailed description and accompanying drawings.

BRIEF DESCRIPTION OF THE DRAWINGS

FIG. 2 is an exploded view of the panel filter of FIG. 1.

FIG. 2a is a cross-section view of the panel filter of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
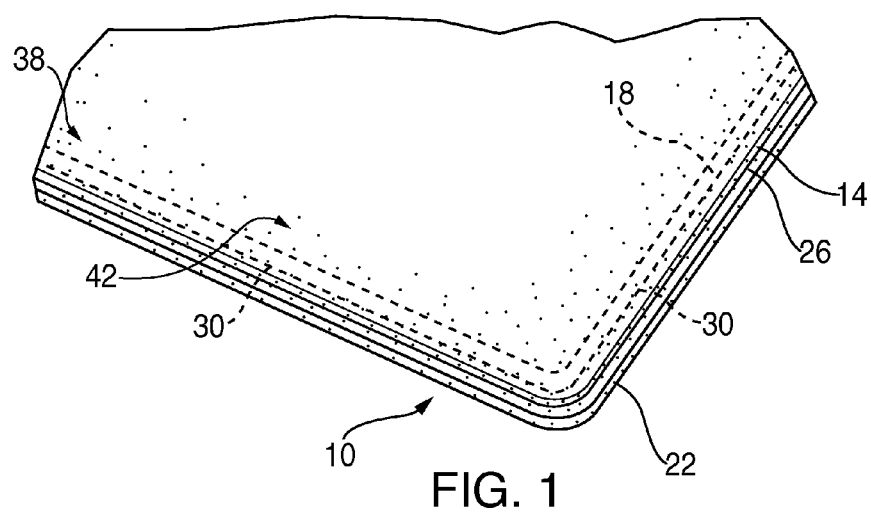
FIG. 1 is a perspective view of a panel filter according to a first embodiment of the invention.

FIGS. 1, 2, and 2a illustrate a panel filter 10 according to one embodiment of the invention. A panel filter 10 may include one or more panels (i.e., a panel link filter). The panel filter 10 includes a first media layer 14, a support grid 18, and a second media layer 22. The support grid 18 is between the first media layer 14 and the second media layer 22. The first media layer 14 and the second media layer 22 are adhesively coupled to one another by an adhesive layer 26 to secure the media layers and to retain the support grid 18 therebetween.

The first media layer 14 is constructed from a first material and the second media layer 22 is constructed from a second material which may be different or the same as the first material. The first material and the second material may be woven or non-woven fabric, nettings, foam, or any other air permeable material (i.e., materials having a minimal efficiency reporting value "MERV" of between 5 and 14).

Figure 3:
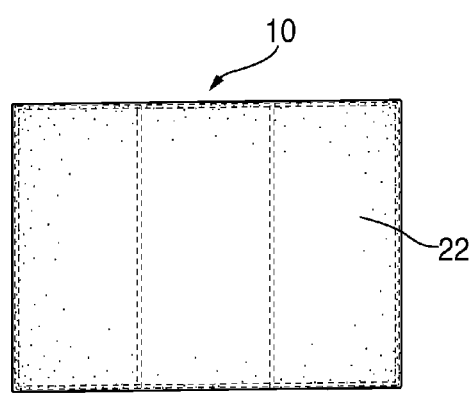
FIG. 3 is a first side view of the panel filter of FIG. 1.
Figure 4:
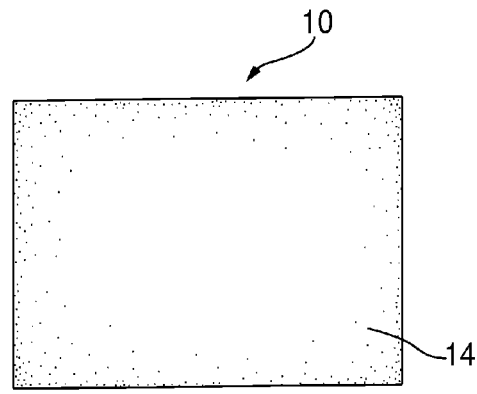
FIG. 4 is a second side view of the panel filter of FIG. 1.

Additionally, at least one of the first or the second materials is also impermeable to particulates having a targeted size or type (i.e., dust, pollen, pollution, and the like), and the choice of materials depends on the purpose of the panel filter and the equipment in which the panel filter functions, as well as the environment in which the equipment operates. However, it should be understood that both media layers could be impermeable to particulates of a targeted size or type. For example, the first and the second materials may be constructed from polyester fibers and polyvinyl chloride (PVC) binder. FIG. 3 illustrates the air entering that side of the panel filter 10 which includes the second media layer 22. FIG. 4 illustrates the air leaving that side of the panel filter 10 which includes the first media layer 14. The first and the second materials may be the same material or different material depending on the application. The material that is used for the first and the second media layers 14, 22, are both at least air permeable. Additionally, alternative embodiments of the panel filter may include additional media layers (i.e., a third media layer, a fourth media layer, etc.) that may include additional filtering or provide additional structural support to the panel filter. In some embodiments, one or both of the first and the second media layers may be used to filter particulates of targeted size or type. In other embodiments, one of the first or the second media layers is not selected for filtration and is used as a support layer for retaining the support grid within the panel filter.

Figure 5:
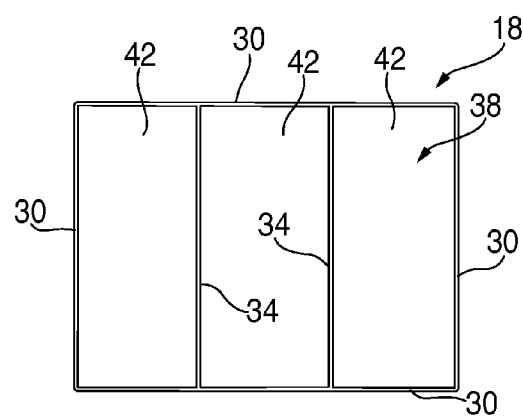
FIG. 5 is a top view of a support grid that is included in the panel filter of FIG. 1.
Figure 6:
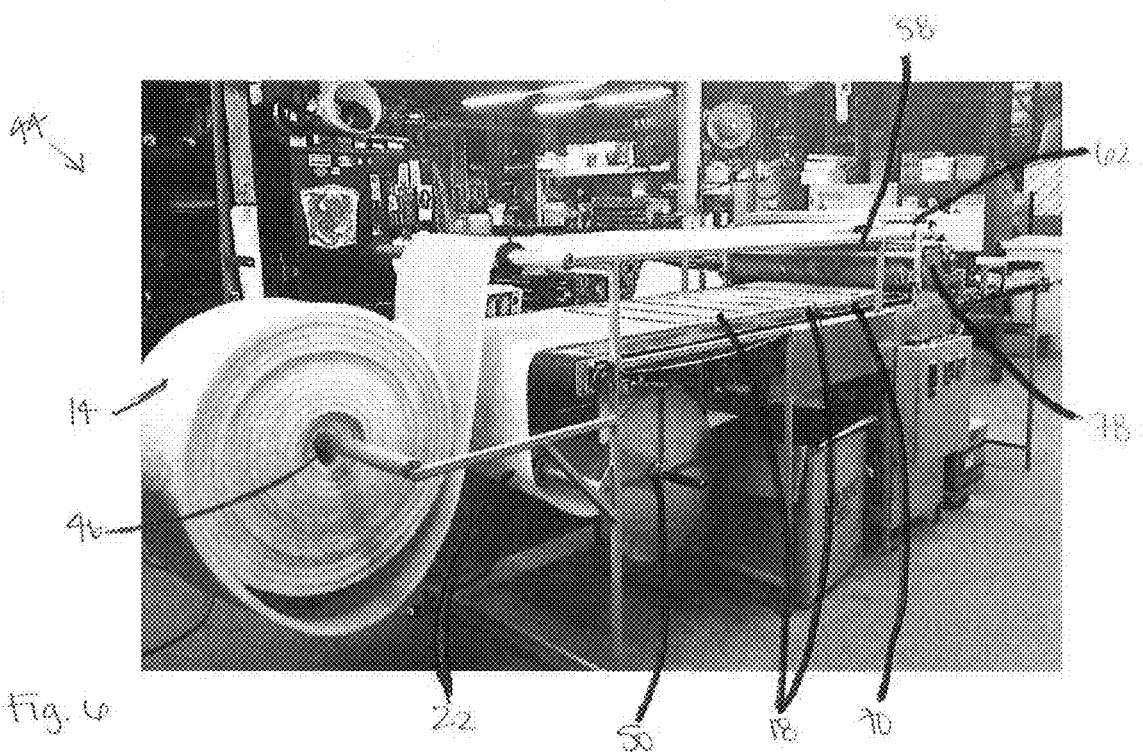
FIG. 6 is a front perspective view of an assembly line used to manufacture the panel filter of FIG. 1.
Figure 7:
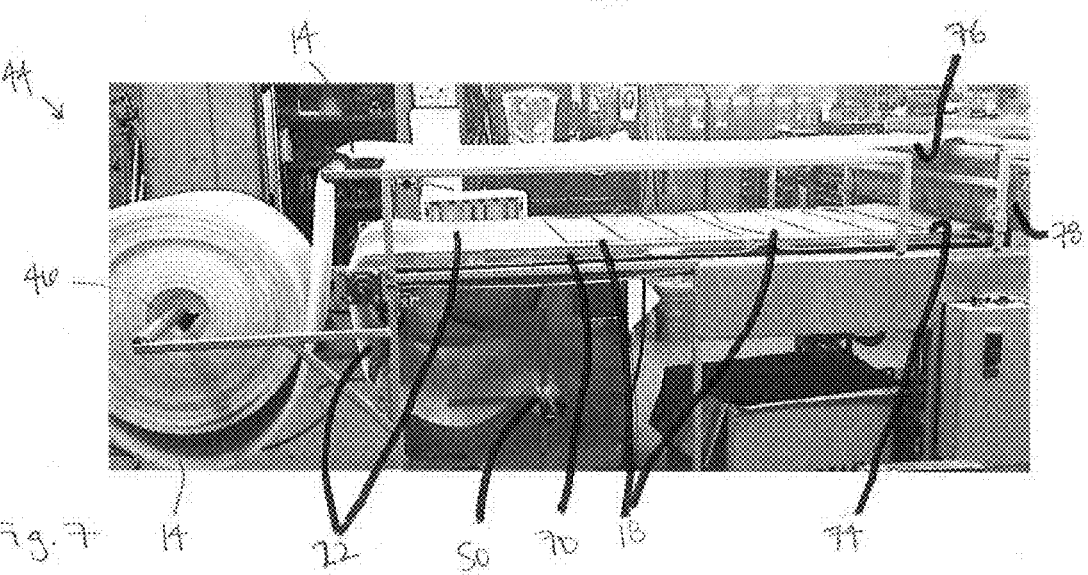
FIG. 7 is a side view of the assembly line of FIG. 4
Figure 8:
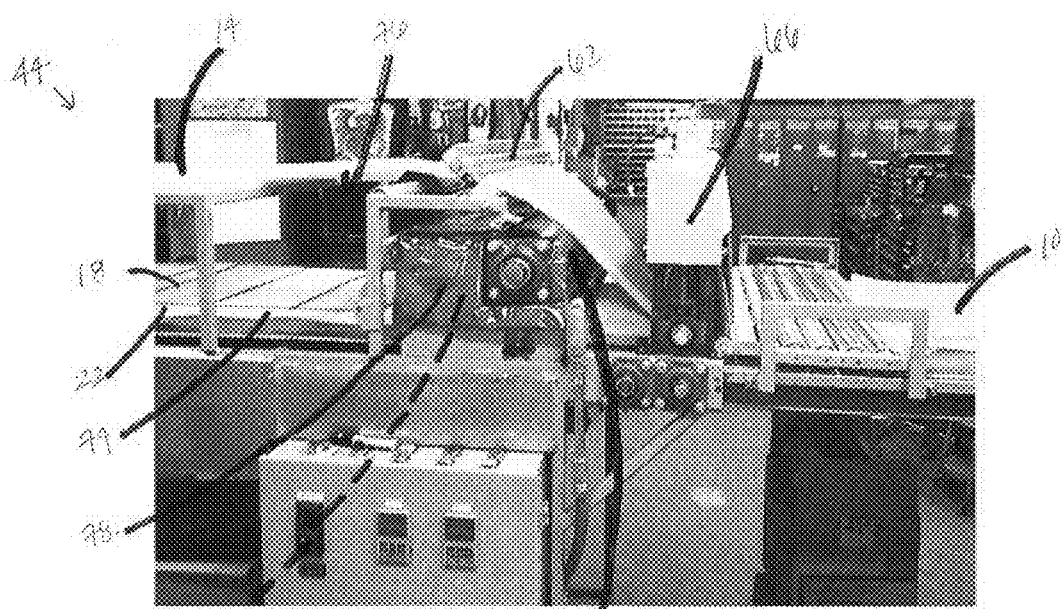
FIG. 8 is an enlarged side view of the assembly line of FIG. 4
Figure 9:
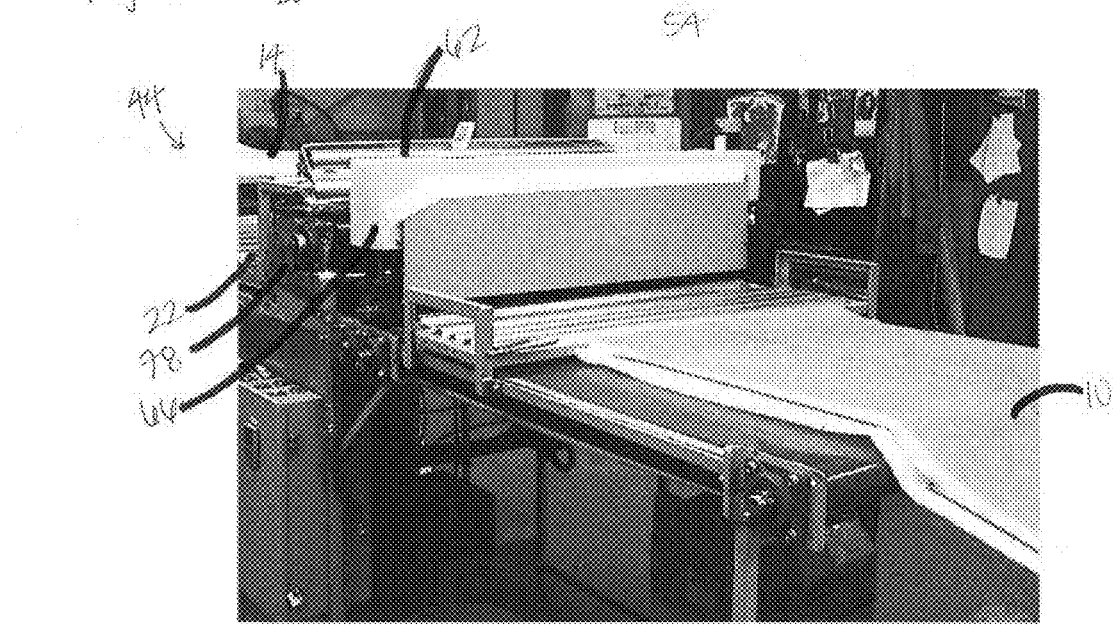
FIG. 9 is another side view of the assembly line of FIG. 4.

The support grid 18 (FIGS. 1, 2, and 5) may be constructed from any suitable rigid material including, but not limited to, metal, plastic, or wood. In the illustrated embodiment, the support grid 18 is a substantially rectangular structure including thin walls 30 constructed from thin metal. The support grid 18 that is illustrated also includes intermediate walls 34 that break an interior area 38 of the support grid 18 into a plurality of sections or openings 42. The support grid 18 may have other configurations. For example, the support grid may include alternative shapes and sizes other than those depicted herein.

The adhesive layer 26 is between and adhesively couples the first and the second media layers 14, 22. The adhesive may be in liquid form or may be initially in solid form (e.g., a glue web) which is then liquefied during the panel filter assembly process. In the illustrated embodiment of FIG. 1, the adhesive layer 26 is a glue web. However, the adhesive layer 26 could alternatively be composed of ethylene-vinyl acetate (EVA) copolymer. If the EVA copolymer is used, it is liquefied from its solid-state (FIGS. 6-9) through a hot-melt process and applied to one or both of the first or the second media layers 14, 22 for sealing the panel filter 10. Other compositions may be used for the adhesive layer. Other examples of adhesive layer materials include polyolefins, polyamides, polyesters, thermoplastic polyurethanes, styrene block copolymers, styrene-isoprene-styrene, styrene-ethylene/butylene-styrene, polycaprolactone, polycarbonates, fluoropolymers, silicone rubbers, thermoplastic elastomers, or polypyrrole. Regardless of the type of adhesive that is used, the adhesive layer 26 is air permeable to prevent adverse impact on the ability of the panel filter media to capture desired particulate or to avoid significantly increasing the air resistance of the panel filter.

FIGS. 6-9 illustrate a continuous process of manufacturing or assembling the panel filter 10. Unlike conventional panel filter assembly processes that involve substantial manual intervention—such as by manually applying an adhesive to a media layer and manually applying the two media layers together—the process described herein is substantially automated. The assembly 44 is configured such that the first media layer 14 is retained on a first spool 46 and the second media layer 22 is retained on a second spool 50. The first media layer 14 and the second media layer 22 are spaced apart from one another on spaced spools 46, 50. In the embodiment of FIGS. 6-9, a liquefied adhesive (i.e., liquefied EVA) is used for the adhesive layer 26. Therefore, a distal end of each of the first media layer 14 and the second media layer 22 is guided from the first and the second spools 46, 50, respectively, to an adhesive roller 54 (i.e., hot roller). In particular, the first media layer 14 is threaded past a positioning roller 62 to a first compression roller 66. Rotation of a first compression roller 66 and auxiliary compression rollers 68 propel the first media layer 14 along a first platform 58 from the spool 46 past the first positioning roller 62 and between the first compression roller 66 and a second platform 70, which is spaced apart from the first platform 58. The first media layer 14 is also guided (i.e., by the first compression roller 66) over the adhesive roller 54. Similarly, the second media layer 22 is threaded to the first compression roller 66 such that rotation of the first compression roller 66 and the auxiliary compression rollers 68 propel the second media layer 22 along the second platform 70. As discussed below, the first compression roller 66 also serves as a pressure source. The auxiliary compression rollers 68 apply additional pressure to the first and the second media layers 14, 22. The adhesive and compression rollers 54, 66 are motorized.

The adhesive roller 54 is rotatable relative to both the first and the second platforms 58, 70. The adhesive roller 54 contacts and carries the adhesive layer 26, which is contained in a receptacle (i.e., melt pot) 78 between the first platform 58 and the second platform 70. The adhesive roller 54 transfers, by contact, the adhesive layer 26 to the surface 76 of the first media layer 14; although in other embodiments the adhesive roller 54 may transfer, by contact, the adhesive layer to either or both of the surface 76 of the first media layer 14 and/or the surface 74 of the second media layer 22. In the illustrated embodiment, the second media layer 22 is guided below the adhesive roller 54. While the second media layer 22 extends from the second spool 50 to the adhesive roller 54, the support grids 18 are placed adjacent one another on a surface 74, which faces a surface 76 of the first media layer 14, of the second media layer 22. After the adhesive layer 26 is applied to one or both of the first media layer 14 and the second media layer 22, the first media layer 14 and the second media layer 22 are adhesively coupled by pressure applied by the first compression roller 66 and the auxiliary pressure rollers 68. In particular, the first media layer 14 moves in the direction of the second platform 70 such that the surfaces 76, 74 of the first media layer 14 and the second media layer 22, respectively, are adjacent to and aligned with one another, with the support grid 18 therebetween. Pressure applied by the first compression roller 66 to the first and the second media layers 14, 22 adhesively couples the first and the second media layers 14, 22, thereby retaining the support grid 18 in a fixed position between them. The support grid 18 is anchored to one or both of the first media layer 14 or the second media layer 22.

As discussed above, the adhesive layer 26 may be in the form of a glue web rather than liquefied adhesive. If a glue web is used for the adhesive layer 26, the receptacle 78 and the adhesive roller 54 are replaced by an oven used to melt the glue web. The glue web is retained on a spool and introduced between the first and the second media layers 14, 22 using similar methods as described above (i.e., rotation of the motorized compression rollers 66). The glue web may be placed in between the support grid 18 and either of the first or the second media layers 14, 22. In either case, either or both of the first media layer 14 and the second media layer 22, the support grid 18, and the glue web are guided through the oven by a mechanized belt. Once the glue web is melted, like the process of FIGS. 6-9, the first media layer 14, the second media layer 22, the support grid 18, and the adhesive layer 26 are propelled to the first compression roller 66. Pressure applied by the first compression roller 66 to the first and the second media layers 14, 22 adhesively couples the first and the second media layers 14, 22, thereby retaining the support grid 18 in a fixed position between them. The support grid 18 adheres to one or both of the first media layer 14 or the second media layer 22.

The panel filters 10 may be assembled individually (i.e., one support grid per panel filter). Alternatively, the panel filters 10 may be cut from panel link filters. An assembled panel filter link may be cut by an edge trimmer (not shown) at a location between adjacent support grids 18 to create individual panel filters 10. Otherwise, the appropriate length panel filter link may be cut from the assembled multi-panel filter.

The process described above for manufacturing the panel filter 10 is merely exemplary and may be modified depending on the type of materials that are used and the type of panel filter that is desired. For example, additional media layers composed of any type of material may be adhesively coupled to either or both of the first and the second media layers, and the additional layers may be coupled at the beginning or end of the above-described assembly process. For example, each additional layer may be retained on its own spool. In one embodiment, there may be a second compression roller in order to combine a third media layer with one of the first or the second media layers. Once the third media layer is adhered to one of the first or the second media layers, the process would continue as discussed above such that the combined third media layer and one of the first and the second media layers, together, are guided to the first compression roller 66. Alternatively, the process of FIGS. 6-9 could be run twice, except the support grid 18 would not be applied during the first run. The first run would combine the third media layer with the one of the first or the second media layer. Then the process of FIGS. 6-9 would be rerun so that the combined third media layer and one of the first or the second media layers would be adhesively coupled with the other of the first and the second media layers. Other configurations to combine additional media layers are contemplated.

Additionally, in the illustrated embodiment, the first platform is above and substantially parallel to the second platform. However, in other embodiments, the first and the second platforms may be oriented differently (e.g., the platforms could be oriented vertically with the media layers also oriented vertically on an edge) than what is shown and described herein. Further, other ways of applying the adhesive layer are contemplated depending on the type of adhesive that is used.

The panel filter described above in which the first and the second media layers 14, 22 are adhesively coupled has obvious advantages over conventional panel filters. First, the conventional panel filters, when assembled, include mechanical edge seals and mechanical internal seals which are detrimental to air flow. This is because first and second media layers of the conventional panel filters are mechanically coupled to one another. In other words, sewing or welding by a thermal, radio frequency (RF), or ultrasonic sealing head mechanically couples the first and the second media layers to one another in the area of the support grids. The conventional process creates mechanical seals at the edges and internally of the panel filter edges. The mechanical seals create areas where air is impermeable and therefore, this reduces the airflow through the panel filters. These mechanical seals can lead to the reduced effectiveness and life of HVAC equipment, as previously described.

In contrast, the panel filter of the present invention uses the adhesive layer to couple the two or more media layers without mechanical seals, which substantially improves airflow and prevents localized build-up of particulates. Additionally, the lack of mechanical seal prevents surface indentations or depressions in either of the first or the second media layers, which are characteristic of conventional panel filters that are bonded with mechanical seals. As such, the inventive panel filters have increased surface area for allowing air to pass therethrough. Similarly, more of the panel filter is able to hold captured particulates of a targeted size or type as none of the media layers' surface area has been restricted by the sealing process. Further, the adhesive layer more thoroughly and evenly secures the media layers of the panel filter. As a result, the panel filter bows and flutters less when exposed to typical airflows utilized in residential, commercial and industrial HVAC and paint booth systems. This reduces the inadvertent release of captured particulates from the panel filter, panel filter bowing, and undesirable contact between the panel filter and downstream equipment or other panel filters.

The above-described process of manufacturing the inventive panel filters also has obvious advantages over conventional processes. As discussed above, the conventional panel filters are assembled with mechanical seals, which require sewing equipment or thermal, RF, or ultrasonic welding equipment. Specifically, dies, tooling, and/or seal bars are necessary for assembly of the conventional panel filters. Additionally, the process is not continuous as the equipment and materials must be manually guided and cycled to accommodate the location of the support grids and the formation of the edge and internal seals.

In contrast, the process described above for manufacturing the inventive panel filters does not require any of the auxiliary equipment to couple the media layers. Further, without this equipment, the process is continuous, which reduces time for producing the panel filters. The process of manufacturing the inventive panel filters also allows for combining of different materials for each of the media layers regardless of their surface area or composition of the material of the media layers. Additionally, the process affords the ability to create custom sized panel filters or panel link filters without customizing the process of FIGS. 6-9 or equipment for the same. In other words, dies, tooling, and/or seal bars no longer need to be customized in order to manufacture custom sized panel filters.

Various features and advantages of the invention are set forth in the following claims.

What is claimed is:

1. A panel filter comprising:
   a first media layer constructed from a first material that is permeable to air and impermeable to particulates of a targeted size or type;
   a support grid;
   a second media layer constructed from a second material that is permeable to air; and
   an adhesive layer of substantially the same shape and area as the first media layer and between the first media layer and the second media layer, the adhesive layer configured to adhesively couple the first media layer to the second media layer;

wherein when the first media layer and second media layer are coupled, the support grid is between the adhesive layer and one of the first and second media layers and is retained between the first media layer and second media layer.

2. The panel filter of claim 1, wherein the second material is impermeable to particulates of a targeted size and type.

3. The panel filter of claim 2, wherein the first material and the second material are the same material.

4. The panel filter of claim 2, wherein the first material and the second material are different materials.

5. The panel filter of claim 1, further comprising a third media layer coupled to one of the first media layer and the second media layer.

6. A panel filter comprising:
a first media layer constructed from a first material that is permeable to air and impermeable to particulates of a targeted size and type;
a support grid;
a second media layer constructed from a second material that is permeable to air; and
a continuous air permeable adhesive layer of substantially the same shape and area as the first media layer and between the first and second media layers, the adhesive layer coupling the first media layer to the second media layer;
wherein when the first media layer and second media layer are coupled, the support grid is retained between the first media layer and the second media layer.

7. The panel filter of claim 6, wherein the second material is impermeable to particulates of a targeted size and type.

8. The panel filter of claim 7, wherein the first material and the second material are the same material.

9. The panel filter of claim 7, wherein the first material and the second material are different materials.

10. The panel filter of claim 6, further comprising a third media layer coupled to one of the first media layer and the second media layer.

* * * * *